(12) United States Patent
Gould

(10) Patent No.: US 7,236,783 B2
(45) Date of Patent: Jun. 26, 2007

(54) METHOD FOR PROVISIONING A TELEMATICS UNITS

(75) Inventor: Garett W. Gould, Troy, MI (US)

(73) Assignee: General Motors Corporation, Detroit, MI (US)

(*) Notice: Subject to any disclaimer, the term of this patent is extended or adjusted under 35 U.S.C. 154(b) by 184 days.

(21) Appl. No.: 10/762,424

(22) Filed: Jan. 22, 2004

(65) Prior Publication Data
US 2005/0164680 A1 Jul. 28, 2005

(51) Int. Cl.
H04Q 7/20 (2006.01)
H04M 3/00 (2006.01)

(52) U.S. Cl. .................. 455/435.1; 455/418; 455/419; 455/420

(58) Field of Classification Search ................ 455/420; 701/201, 213
See application file for complete search history.

(56) References Cited

U.S. PATENT DOCUMENTS 6,950,660 B1* 9/2005 Hsu et al. ................ 455/456.1

2004/0259524 A1* 12/2004 Watkins et al. ............. 455/405
2005/0075892 A1* 4/2005 Watkins et al. ................ 705/1

* cited by examiner

Primary Examiner—Duc M. Nguyen
Assistant Examiner—Mazda Sabouri
(74) Attorney, Agent, or Firm—Anthony Luke Simon

(57) ABSTRACT

A method for provisioning a telematics units comprising the steps of: initiating a wireless over the air service provisioning session between a telematics unit and a wireless network carrier, wherein data is downloaded from the wireless network carrier to the telematics unit during the over the air service provisioning session; and upon completion of the over the air service provisioning session between the telematics unit and the wireless network carrier, automatically initiating a call from the telematics unit to a telematics service provider, wherein at least a portion of the data downloaded from the wireless network carrier to the telematics unit is uploaded to the telematics service provider.

8 Claims, 2 Drawing Sheets

METHOD FOR PROVISIONING A TELEMATICS UNITS

FIELD OF THE INVENTION

This invention relates to a method for provisioning a telematics units.

BACKGROUND OF THE INVENTION

Wireless communications devices, including mobile or handheld units, are typically provisioned via a method entitled OTASP, or Over The Air Service Provisioning. OTASP downloads telephony parameters, including a MIN (Mobile Identification Number), a PRL (Preferred Roaming List), and other data from a carrier OTASP server to a mobile unit, making the mobile unit ready for use. The MIN is a phone number assigned by the carrier or wireless service provider to the mobile unit. A PRL is a list of bands and channels in order of preference that the mobile unit uses when attempting to locate and connect to a cell system.

Some telematics service providers, or TSPs, offer personal calling services that allow a telematics subscriber to place and receive calls using a telematics unit. This enables the telematics unit to function in a similar fashion to a handheld mobile unit. OTASP performs well for carriers provisioning mobile units, but may be more difficult to use as a tool allowing third party entities, such as TSPs, to enable personal calling services. If the TSP and carrier are different entities, their systems may not be on the same network. Thus, there may be a delay between the time when the telematics unit is provisioned and the time when the TSP has the information identifying the newly provisioned telematics unit due to the necessity to transfer data from the carrier system to the TSP. It is desirable to minimize or eliminate this delay to speed the enabling of telematics services between the TSP and the owner of the telematics unit.

SUMMARY OF THE INVENTION

Advantageously, this invention provides a method of provisioning a telematics unit using OTASP.

Advantageously, according to a preferred example, this invention provides a method for a telematics unit to automatically initiate a call to a telematics service provider, notifying the TSP that a successful wireless service provider or carrier OTASP session is complete and providing the TSP with relevant provisioning data.

Advantageously, according to a preferred example, this invention provides a method provisioning a telematics units comprising the steps of: initiating a wireless over the air service provisioning session between a telematics unit and a wireless network carrier, wherein data is downloaded from the wireless network carrier to the telematics unit during the over the air service provisioning session; and upon completion of the over the air service provisioning session between the telematics unit and the wireless network carrier, automatically initiating a call from the telematics unit to a telematics service provider, wherein at least a portion of the data downloaded from the wireless network carrier to the telematics unit is uploaded to the telematics service provider.

DETAILED DESCRIPTION OF A PREFERRED EMBODIMENT

Figure 1:
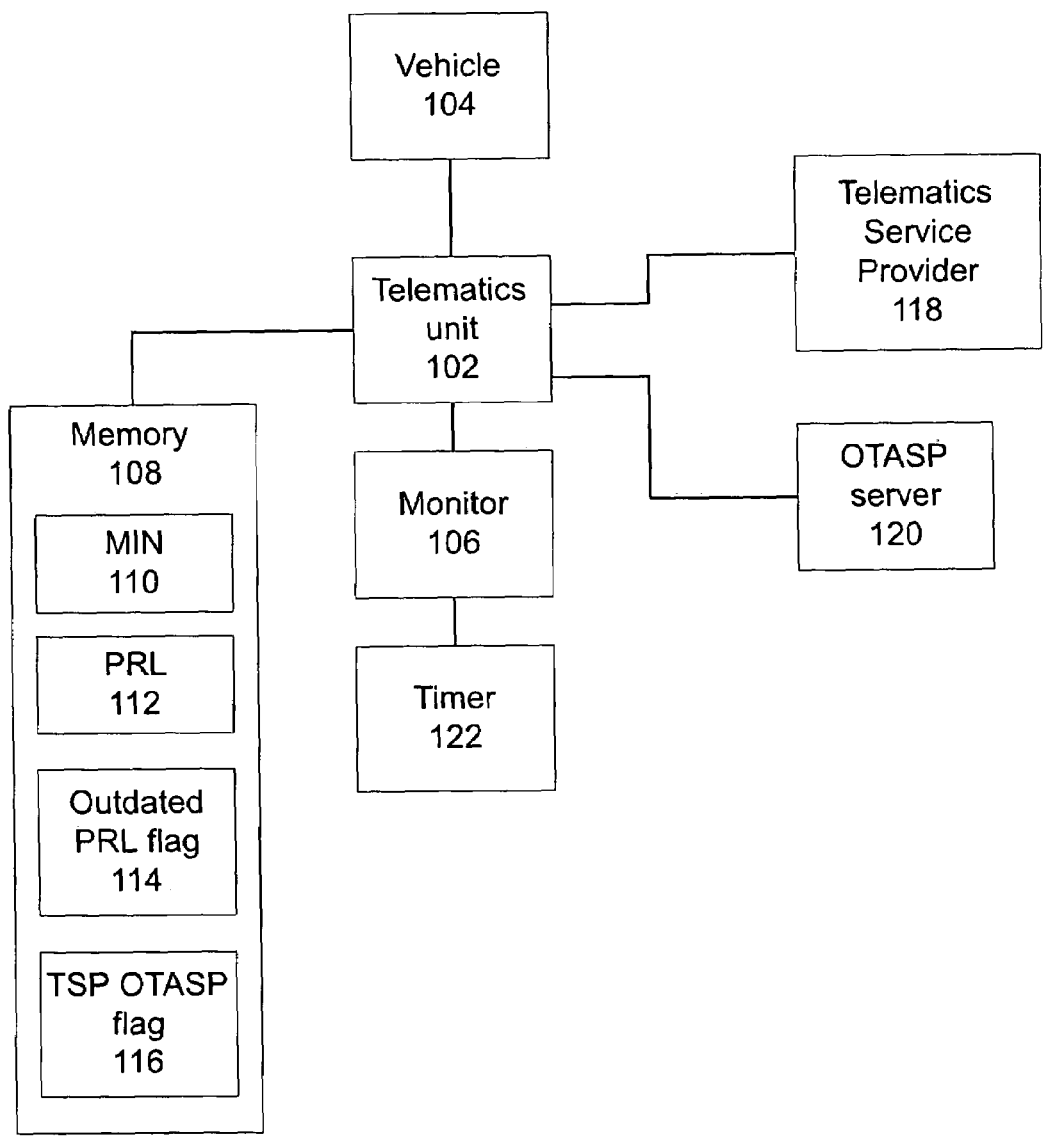
FIG. 1 is a schematic diagram of a system for provisioning a telematics unit in accordance with an example of the current invention at 100.

FIG. 1 illustrates an example system according to the present invention at 100. A telematics unit 102 associated with a vehicle 104 may be initially configured with a collection of customer information including customer name, address, zip code and services selected. The initial configuration also loads a non-geographic specific telephone number into the telematics unit memory 108 in place of a MIN (Mobile Identification Number) 110. This number is used to allow a telematics service provider (TSP) 118 to call the telematics unit 102. A partial PRL (Preferred Roaming List) may be installed in the telematics unit 102 memory 108 in an area partitioned for the PRL 112. A partial PRL contains a list of preferred bands and channels within the vicinity of the customer's home address, or the point of purchase of the unit, as opposed to a complete PRL that contains a nationwide list of preferred bands and channels.

A timer 122 is associated with a monitor 106 within the telematics unit 102 is loaded with a default count value at time of manufacture. The default count value stored within the timer 122 represents a period of twenty four hours. The timer 122 default value may be overwritten during initial configuration. Upon completion of the initial configuration, the timer value begins to decrement. When the timer value decrements to zero, the timer is reset and is reloaded with the default value or the value that was loaded during initial configuration. This begins a new timer period.

An Outdated PRL flag 114 is initially set to true within the telematics unit 102 memory 108 to indicate that the current PRL 112 is either outdated or incomplete. Setting the Outdated PRL flag 114 to true causes the software monitor 106 associated with the telematics unit 102 to initiate an OTASP session with a wireless service provider, or carrier OTASP server 120. The OTASP session with the carrier is initiated by the telematics unit dialing a pre-programmed number used for OTASP provisioning only. The OTASP session initiation with the carrier OTASP server 120 occurs when power is applied to the telematics unit 102.

The OTASP session with the carrier OTASP server 120 may be interrupted if power to the telematics unit 102 is lost, or communication fails between the telematics unit 102 and the carrier OTASP server 120. Furthermore, the carrier OTASP server may not have all of the required data available, such as the MIN, at the time of the OTASP call initiated by the telematics unit 102. When this occurs, the Outdated PRL flag 114 remains set to true and the carrier OTASP session is reinitiated. If a successful carrier OTASP session occurs, then a MIN is installed along with a complete and updated PRL. The Outdated PRL flag is then set to false.

A TSP OTASP flag 116 is initially set to true, indicating that a carrier OTASP session has yet to occur. The software monitor 106 associated with the telematics unit 102 examines the state of the TSP OTASP flag 116. If the TSP OTASP flag 116 is true, the software monitor 106 examines the conditions to initiate a TSP OTASP session. If the carrier OTASP session has successfully completed, as indicated by the false state of the Outdated PRL flag 114, a TSP OTASP session is initiated.

If the carrier OTASP session has not completed, then a TSP OTASP session is initiated on a vehicle 104 ignition cycle. This condition is indicated by the state of the Outdated PRL flag 114 and the TSP OTASP flag 116. If the outdated PRL flag 114 is false and the TSP OTASP 116 flag is true, then, upon an ignition cycle, a TSP OTASP session is initiated. Only one ignition cycle during the timer period initiates a TSP OSTASP session. This prevents an initiation request on every vehicle 104 ignition cycle and flooding the TSP 118 with unnecessary OTASP calls. The TSP OTASP initiation will become eligible again when the timer period has elapsed and the timer is reloaded with the default or configured count, or when the carrier OTASP session has successfully completed. During the TSP OTASP, the TSP 118 downloads the required data, including the MIN, PRL, and, in an example prepaid calling system, wireless minutes purchased, if any, to provision the telematics unit.

Figure 2:
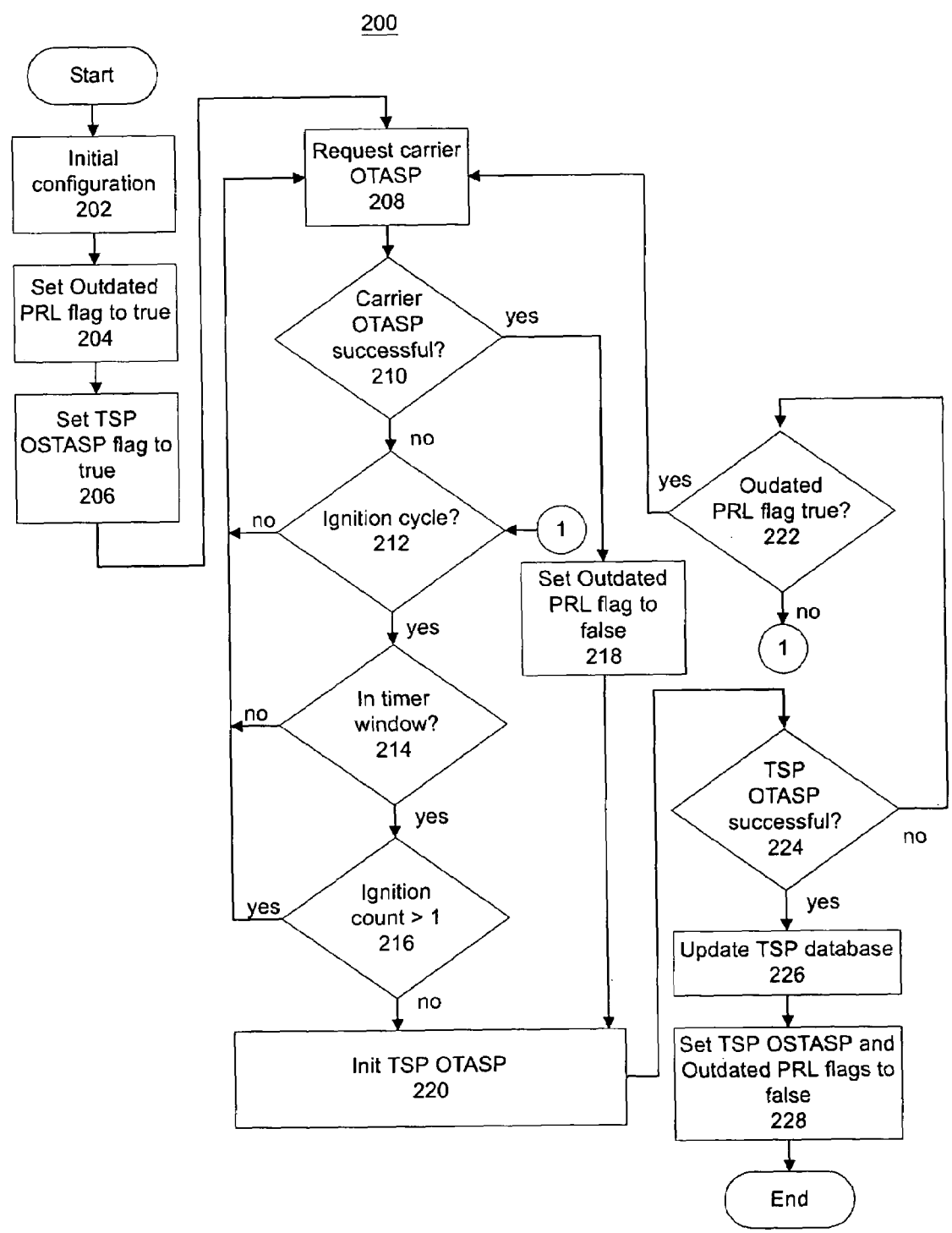
FIG. 2 is a flow chart of a system for provisioning a telematics unit in accordance with an example of the current invention at 200.

FIG. 2 provides a flowchart for enhanced OTASP management for telematics units according to the present invention at 200. A telematics unit undergoes initial configuration 202 at a dealer, service facility, or other manufacturing, storage, or retail location. The initial configuration 202 information may, if desired, contain relevant customer data such as customer name, address, and services selected. The telematics unit is also configured with a non-geographic specific telephone number and a partial PRL (Preferred Roaming List). The non-geographic specific telephone number and partial PRL enable the telematics unit to initiate outbound calls and to accept inbound calls.

An Outdated PRL flag is set to true 204, indicating that the telematics unit has yet to be provisioned by a wireless service provider or carrier OTASP session. A TSP OTASP flag is set to true 206, indicating the telematics unit has yet to be provisioned by a TSP (telematics service provider) OTASP session. A carrier OTASP session is requested 208 from the telematics unit, for example, by dialing a unique number assigned by a carrier or wireless service provider. If all of the required data is available at the carrier assigned to the telematics unit, such as the MIN (Mobile Identification Number) and PRL (Preferred Roaming List), the carrier OTASP session will continue.

A commit message is received from the carrier to indicate the successful download of all of the required data in the OTASP session. Upon receipt of the commit message, the receiving unit is free to commit the received data to persistent storage, and to terminate the call to the carrier OTASP server. This signifies the successful completion of a carrier OPTASP session 210, and informs the monitor (FIG. 1, 106) of the successful completion. The Outdated PRL flag is then set to false 218. With the Outdated PRL flag set to false, the telematics unit (FIG. 1, 102) does not attempt to initiate another carrier OTASP session. Upon successful completion of a carrier OTASP session, a TSP OTSAP session is initiated 220.

If the carrier OTASP session is unsuccessful 210, then the system checks 212 whether there is a vehicle ignition cycle. A vehicle ignition cycle includes starting the engine and energizing the components connected to the vehicle electrical system. If the vehicle is not in an ignition cycle 212, then a new carrier OTASP session is requested 208. If the vehicle is in an ignition cycle 212, then the monitor (FIG. 1, 106) tests if the telematics unit (FIG. 1, 102) is within a timer window 214. Being within a timer window consists of the timer being active within a programmed period, or epoch. After the programmed period expires, the timer resets and begins a new period or epoch.

The ignition cycles are counted during a timer period. If the ignition count is greater than one 216 within a timer period, then a carrier OTSAP request 208 is reinitiated. This prevents the telematics service provider (FIG. 1, 118) from receiving frequently repeated calls. If the ignition count is less than one, then a TSP OSTASP session 220 is initiated.

There are two primary modes for the TSP OTASP session 220. The first is if there has been no successful carrier OTASP and the second is if there has been a successful carrier OTASP. If there was no successful carrier OTASP, the telematics service provider (FIG. 1, 118) downloads the required data, including the MIN (Mobile Identification Number), PRL (Preferred Roaming List), and, in one example, the number of calling time minutes purchased to the telematics unit. If there has been a successful carrier OTASP, then the MIN and PRL do not need to be downloaded, but other information, such as purchased calling time minutes may be downloaded. In addition, any data in the telematics unit downloaded by the carrier OTASP is uploaded to the TSP if required for the TSP database. For example, the new MIN is uploaded to the TSP for storage in a database to correspond to the particular telematics unit and customer.

If TSP OSTASP session is not successful 224, then the Outdated PRL flag is examined 222 by the monitor (FIG. 1 106). If the Outdated PRL flag is true, then a carrier OTASP session is requested 208. If the Outdated PRL flag is false 222, then an ignition cycle is examined 212. If the TSP OTASP session is successful, 224, then the TSP database containing the telematics unit telephony parameters is updated 226. The TSP OSTASP flag is set to false 228, and the outdated PRL flag is set to false. Setting the TSP OTASP flag and the outdated PRL flag to false 228 notifies the monitor (FIG. 1 106) that telematics unit is provisioned and that no further OTASP initiation is required.

Thus in a preferred example, the system automatically initiates a TSP OTASP session by utilizing a timer within the telematics unit and counting vehicle ignition cycles within the timer period. If a carrier or wireless service provider OTASP session has not occurred, or has failed, then by examining the state of a set of flags and the count of the ignition cycles within a timer period, the telematics unit initiates a call to the TSP to request a TSP OTASP session. Under these conditions the TSP OTASP session provides all of the required telephony parameters to enable the personal calling functionality within the telematics unit.

If the carrier or wireless service provide OTASP session was successful, then relevant data, such as MIN, is provided to the TSP through the telematics unit automatically calling the TSP and transmitting the data to the TSP during the call. The TSP then updates its database with the newly acquired information. The updated database is then used to provide telematics services through the telematics unit in a known manner.

The invention claimed is:

1. A method for provisioning a telematics unit comprising the steps of:

initiating a wireless over-the-air service provisioning session between the telematics unit and a wireless network carrier, wherein data is downloaded from the wireless network carrier to the telematics unit during the over-the-air service provisioning session;

determining whether the over-the-air service provisioning session with the wireless network carrier was successful;

responsive to the determining step, if the over-the-air service provisioning session with the carrier was not successful, initiating a telematics service provider over-the-air service provisioning session, wherein the data is downloaded to the telematics unit during the telematics service provider over-the-air service provisioning session; and if the over-the-air service provisioning session with the carrier was successful, automatically initiating a call from the telematics until to the telematics service provider, wherein at least a portion of the data downloaded from the wireless network carrier to the telematics unit is uploaded to the telematics service provider.

2. The method of claim 1, also comprising the steps of:
updating a database at the telematics service provider with the data uploaded from the telematics unit; and
utilizing the updated database to provide telematics services through the telematics unit.

3. The method of claim 1, wherein the telematics service provider over-the-air provisioning service session is initiated by a vehicle ignition cycle.

4. The method of claim 1, wherein the telematics service provider over-the-air service provisioning session is initiated based on a number of ignition cycles counted within a predetermined period of time.

5. A computer-readable medium encoded with computer-executable instructions for provisioning a telematics unit, comprising:
instructions for initiating a wireless over-the-air service provisioning session between the telematics unit and a wireless network carrier, wherein data is downloaded from the wireless network carrier to the telematics unit during the over-the-air service provisioning session;

instructions for determining whether the over-the-air service provisioning session with the wireless network carrier was successful;

instructions for initiating a telematics service provider over-the-air service provisioning session responsive to the determining step if the over-the-air service provisioning session with the carrier was not successful, wherein the data is downloaded to the telematics unit during the telematics service provider over-the-air service provisioning session; and instructions for automatically initiating a call from the telematics until to the telematics service provider if the over-the-air service provisioning session with the carrier was successful, wherein at least a portion of the data downloaded from the wireless network carrier to the telematics unit is uploaded to the telematics service provider.

6. The computer-readable medium of claim 5, also comprising instructions for:
updating a database at the telematics service provider with the data uploaded from the telematics unit; and
utilizing the updated database to provide telematics services through the telematics unit.

7. The computer-readable medium of claim 5, wherein the telematics service provider over-the-air provisioning service session is initiated by a vehicle ignition cycle.

8. The computer-readable medium of claim 5, wherein the telematics service provider over-the-air service provisioning session is initiated based on a number of ignition cycles counted within a predetermined period of time.

* * * * *